United States Patent
Kottapalli et al.

(10) Patent No.: US 7,051,191 B2
(45) Date of Patent: May 23, 2006

(54) RESOURCE MANAGEMENT USING MULTIPLY PENDENT REGISTERS

(75) Inventors: Saliesh Kottapalli, Milpitas, CA (US); Udo Walterscheidt, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 575 days.

(21) Appl. No.: 10/035,883

(22) Filed: Dec. 26, 2001

(65) Prior Publication Data
US 2003/0120902 A1 Jun. 26, 2003

(51) Int. Cl.
*G06F 9/312* (2006.01)

(52) U.S. Cl. ............ 712/217; 712/216; 712/218; 712/225

(58) Field of Classification Search ........ 712/216, 712/217, 218
See application file for complete search history.

(56) References Cited

U.S. PATENT DOCUMENTS

| | | | |
|---|---|---|---|
| 5,488,730 A * | 1/1996 | Brown et al. ............ | 712/41 |
| 5,848,288 A | 12/1998 | O'Connor ............ | 712/24 |
| 5,872,986 A | 2/1999 | Heeb ............ | 712/1 |
| 5,918,033 A | 6/1999 | Heeb et al. ............ | 712/217 |
| 5,961,630 A | 10/1999 | Zaidi et al. ............ | 712/200 |
| 6,115,808 A | 9/2000 | Arora ............ | 712/219 |
| 6,219,781 B1 | 4/2001 | Arora ............ | 712/217 |
| 6,233,690 B1 | 5/2001 | Choi et al. ............ | 713/322 |
| 6,237,087 B1 | 5/2001 | O'Connor ............ | 712/226 |
| 6,253,315 B1 | 6/2001 | Yeh ............ | 712/238 |
| 6,304,955 B1 | 10/2001 | Arora ............ | 712/217 |
| 6,367,004 B1 | 4/2002 | Grochowski et al. ....... | 712/226 |
| 6,401,195 B1 | 6/2002 | Arora et al. ............ | 712/218 |
| 6,470,445 B1 * | 10/2002 | Arnold et al. ............ | 712/218 |

\* cited by examiner

*Primary Examiner*—Kenneth S. Kim
(74) *Attorney, Agent, or Firm*—Hanley, Flight & Zimmerman, LLC

(57) ABSTRACT

A resource management system and method is disclosed. The resource management system and method enable first and second instructions, each of which requires access to a memory resource, to be processed in an instruction pipeline at the same time. The resource management system and method manage the memory resource to prevent a data hazard based on an order of receipt of a first instruction response and a second instruction response.

26 Claims, 5 Drawing Sheets

| V | OV | TO | |
|---|---|---|---|
| 0 | 0 | 0 | NO PENDENCY |
| 0 | 0 | 1 | IN ORDER DATA RETURNS |
| 0 | 1 | 0 | OUT OF ORDER DATA RETURNS (WAW HAZARD) |
| 0 | 1 | 1 | UNUSED STATE |
| 1 | 0 | 0 | PRIMARY PENDENCY |
| 1 | 0 | 1 | UNUSED STATE |
| 1 | 1 | 0 | UNUSED STATE |
| 1 | 1 | 1 | PRIMARY AND SECONDARY PENDENCY |

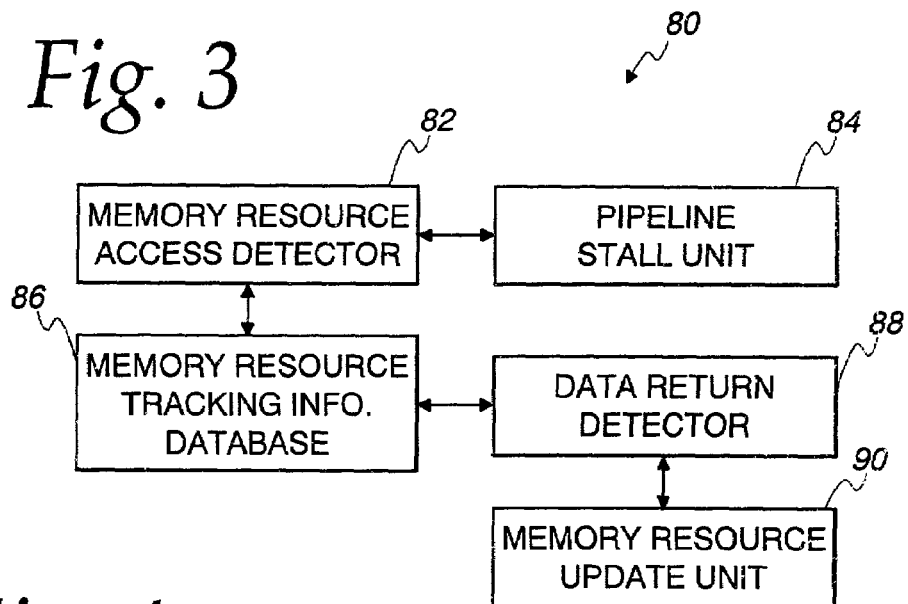
Fig. 3
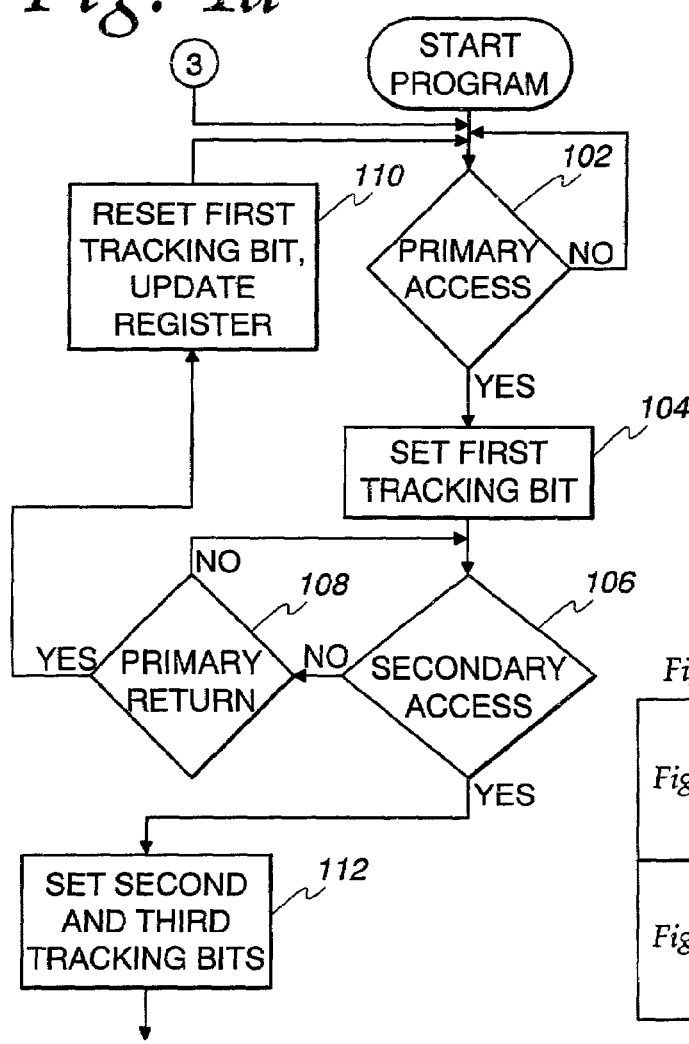
Fig. 4a
Fig. 4
| Fig. 4a |
| --- |
| Fig. 4b |

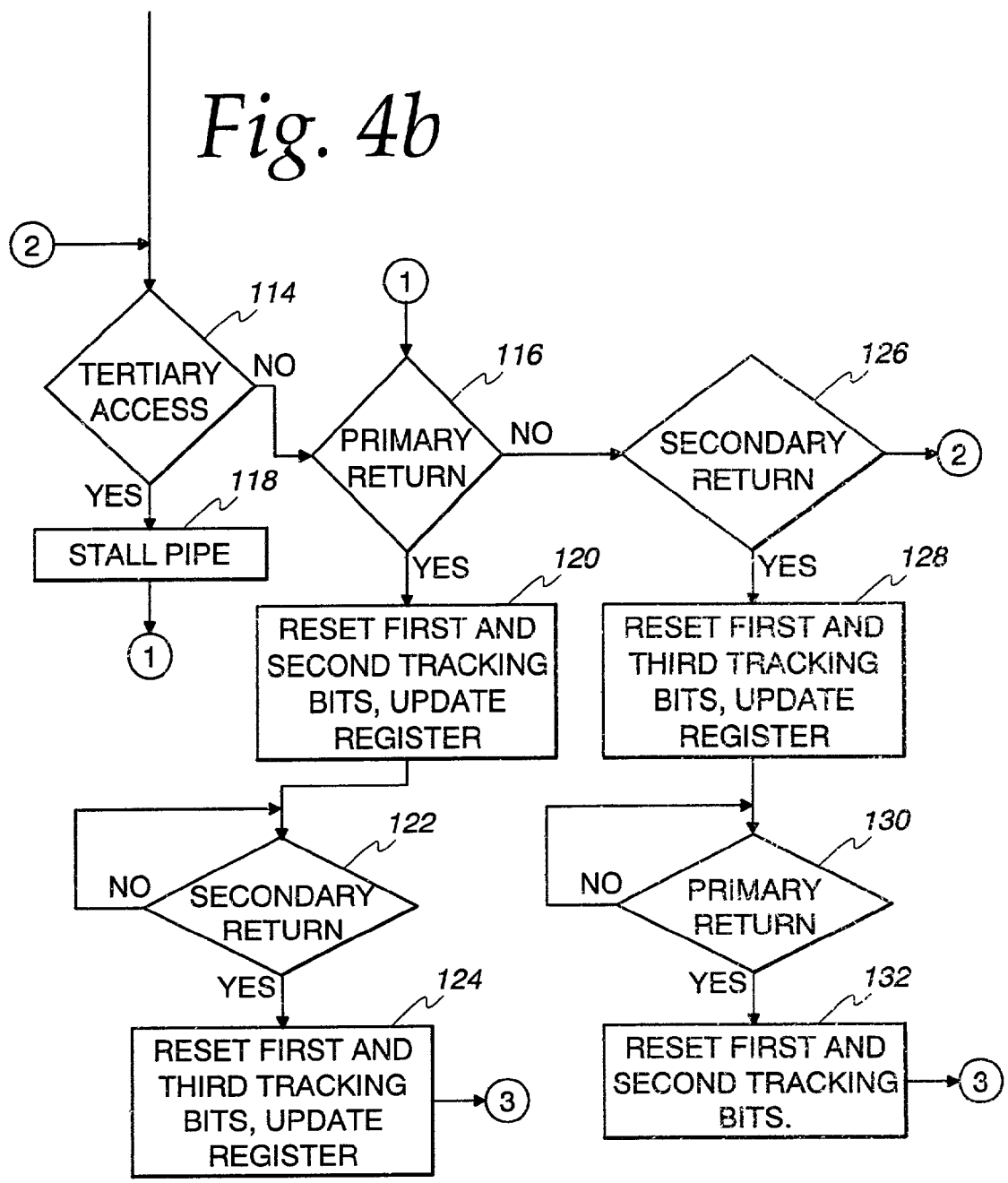

| V | OV | TO | |
|---|----|----|---|
| 0 | 0  | 0  | NO PENDENCY |
| 0 | 0  | 1  | IN ORDER DATA RETURNS |
| 0 | 1  | 0  | OUT OF ORDER DATA RETURNS (WAW HAZARD) |
| 0 | 1  | 1  | UNUSED STATE |
| 1 | 0  | 0  | PRIMARY PENDENCY |
| 1 | 0  | 1  | UNUSED STATE |
| 1 | 1  | 0  | UNUSED STATE |
| 1 | 1  | 1  | PRIMARY AND SECONDARY PENDENCY |

US 7,051,191 B2

RESOURCE MANAGEMENT USING MULTIPLY PENDENT REGISTERS

FIELD OF THE INVENTION

The present invention relates generally to resource management and, more particularly, to systems and methods that use multiply pendent registers to manage hazards.

DESCRIPTION OF THE RELATED ART

All processors use data dependency rules to manage the flow of data during program execution. Generally speaking, data dependency rules are used to prevent data corruption during program execution. In particular, data dependency rules are used to manage processor memory accesses during execution of a program to prevent memory-based data hazards, which typically result in the use of incorrect data by the program. As is well known, memory-based data hazards arise during execution of a program when data read operations and data write operations to system resources such as, for example, general registers, occur in a sequence that is different from the sequence specified by the program code.

There are three types of data hazards, each of which may occur during one of three types of read/write sequences. A read-after-write (RAW) sequence may result in a RAW data hazard when a later or second program instruction requiring a read operation executes its memory read from a memory location or resource (e.g., a general register) before an earlier or first program instruction that writes to that same memory location or resource has executed its write operation. Thus, in the case of a RAW data hazard, a read operation retrieves data from a resource before that resource has been updated by a preceding write operation. A write-after-read (WAR) sequence may also result in a data hazard. A WAR data hazard arises when the results of a write operation associated with a later or second program instruction are stored in a resource before a read operation associated with an earlier or first program instruction has retrieved data from that resource. Additionally, a write-after-write (WAW) sequence may result in a data hazard when a write operation associated with an earlier or first program instruction writes to a resource after a write operation associated with a later or second program instruction has already updated (i.e., written to) the resource. Thus, in the case of a WAW data hazard, the data last stored in a resource is provided by a write operation associated with an earlier or first program instruction, which precedes a later or second program instruction that is specified by the program code to provide the latest update (i.e., write) to the resource.

Historically, data forwarding techniques have been used to prevent RAW data hazards. As is well known, data forwarding techniques enable the result of one instruction to be passed directly to another instruction without requiring an interposing sequence of memory write and read operations. On the other hand, these pipeline stalling techniques have been used to prevent both WAR and WAW data hazards. FIG. 1 is an exemplary diagram that generally illustrates a known architecture 5 with which program instructions or operations may be stalled to prevent a data hazard. As shown in FIG. 1, an instruction pipeline 10 includes a register read stage 12, a plurality of pipeline execution stages 14, 16 and 18, and an instruction commit stage 20. Each of the rows shown in the instruction pipeline 10 of FIG. 1 corresponds to one of a plurality of clock cycles 22. By way of example only, a first load instruction 24 is shown in the commit stage 20 of the instruction pipeline 10 at the same time (i.e., within the same clock cycle) during which a second load instruction 26 is received in the register read stage 12 of the instruction pipeline 10. If the first instruction 24 does not have a deterministic latency, the results of the first instruction 24 may not be immediately updated or written to the memory register A when the first instruction 24 initially reaches the commit stage 20 of the instruction pipeline 10.

To prevent a WAW data hazard, the architecture 5 shown in FIG. 1 sets a bit in a table or scoreboard type data structure 28 to indicate that the register being written to by the first instruction 24 (i.e., register A) is currently pending on a data return. The instruction pipeline 10 is then stalled (i.e., the second instruction 26 in the register read stage 12 is withheld from the execution stages 14–18) for as many clock cycles as needed until a data return is received in response to the first instruction 24. When a data return responsive to the first instruction 24 is received, the scoreboard bit associated with the pending register is reset or cleared and the second instruction 26 is allowed to proceed through the execution stages 14–18 of the instruction pipeline 10.

Although instruction stalling techniques are generally undesirable because they reduce program execution speed, the practical impact of such instruction stalling techniques has been relatively minimal when used with conventional processor architectures. In particular, WAR data hazards are relatively uncommon because they occur when read latencies are longer than write latencies. WAW data hazards have also been uncommon because they occur when different load operations or updates to the same resource have different or non-deterministic latencies and because software typically does not schedule a write operation immediately after a write operation to the same resource without any use of the data provided by the first write operation.

However, more recently, speculative processor architectures have been developed. To increase overall instruction execution speed, these speculative processor architectures allow speculative execution of instructions or operations involving memory accesses prior to program branches. While speculative execution can dramatically increase overall processing speed when a compiler correctly predicts the program execution path, speculative execution can significantly increase the likelihood of WAW data hazards when the program execution follows a path different from that predicted by the compiler. Thus, because speculative processor architectures dramatically increase the likelihood of WAW data hazards, the performance provided by such speculative processor architectures may be significantly limited due to the processing delays that result when conventional instruction stalling techniques are used to prevent data hazards.

BRIEF DESCRIPTION OF THE DRAWINGS

FIG. 3 is an exemplary schematic block diagram of a system that uses the architecture shown in FIG. 2 to manage memory accesses;

FIG. 4 is an exemplary detailed flow diagram illustrating one manner in which the architecture shown in FIG. 2 and the system shown in FIG. 3 may be used to manage memory accesses;

DESCRIPTION

The term "general resources," which is commonly used in connection with processors, encompasses a variety of different types of registers such as, for example, application registers, control registers, general registers, etc. Each of these registers may have a dedicated operational purpose or may be a general purpose type register that serves more than one operational function. For example, during program execution, a processor may access general registers to execute instructions that require memory-based operations such as, for example, load and store instructions or may access general registers to execute instructions that do not require memory-based operations such as, for example, add and subtract instructions.

All general resources and, thus, all registers, correspond to a physical memory such as, for example, a random access memory (RAM), a read only memory (ROM) or any other volatile or non-volatile data storage device, circuit and/or media. Thus, as used herein, the terms "memory" and "memory resource" each encompass the term "general resources" as well as the term "general register," regardless of whether a general resource or register is used for memory-based operations or non-memory base operations. Further, the term "memory accesses," as used herein, encompasses the operational use of (e.g., reading and/or writing to) a physical memory, which may be a general register or any other system or general resource. Still further, the term "memory register" encompasses at least general resource as well as the various operational types or categories of registers (e.g., general register) denoted thereby.

Figure 1:
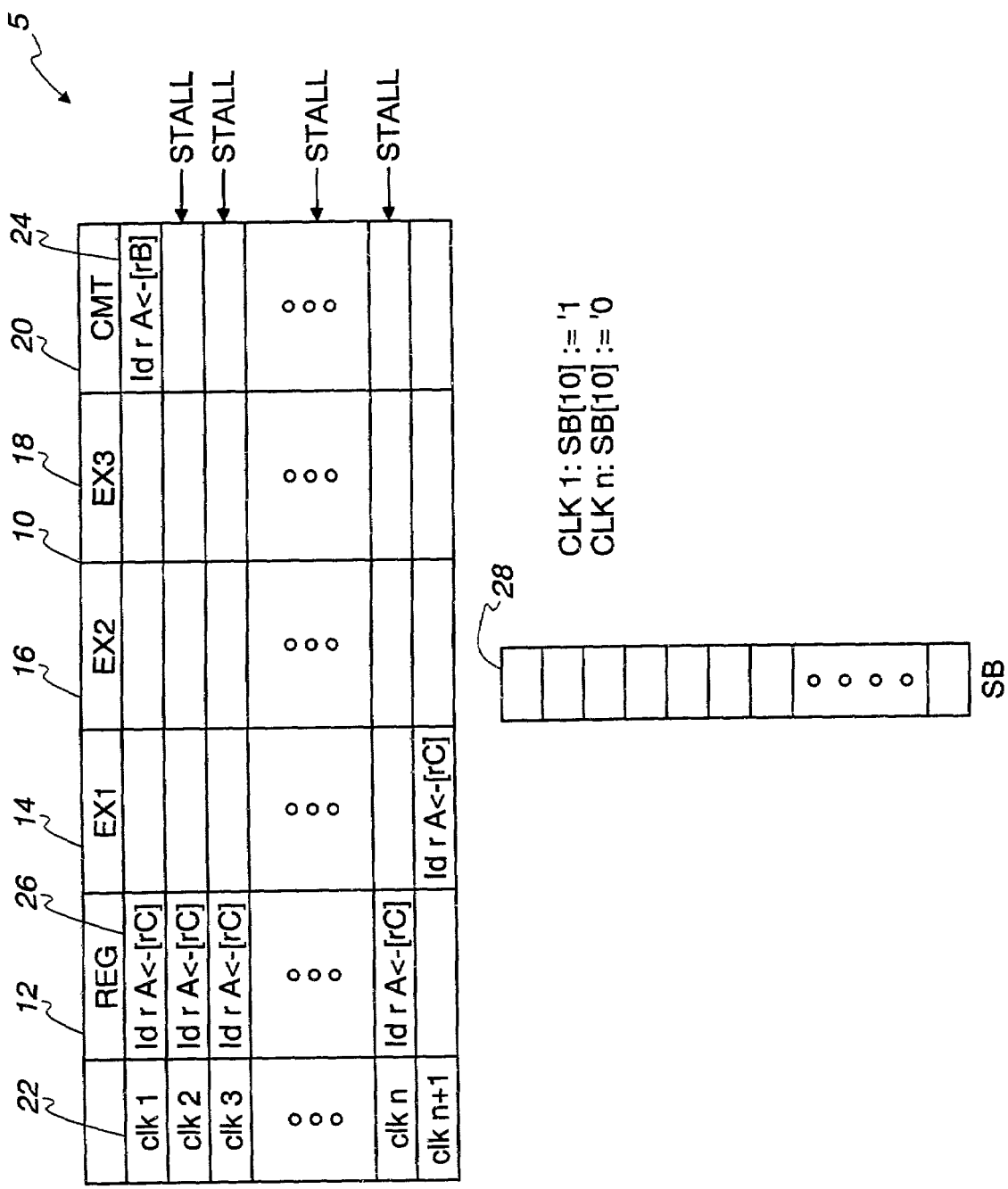
FIG. 1 is an exemplary diagram that generally illustrates a known architecture with which program instructions or operations may be stalled to prevent a data hazard.
Figure 2:
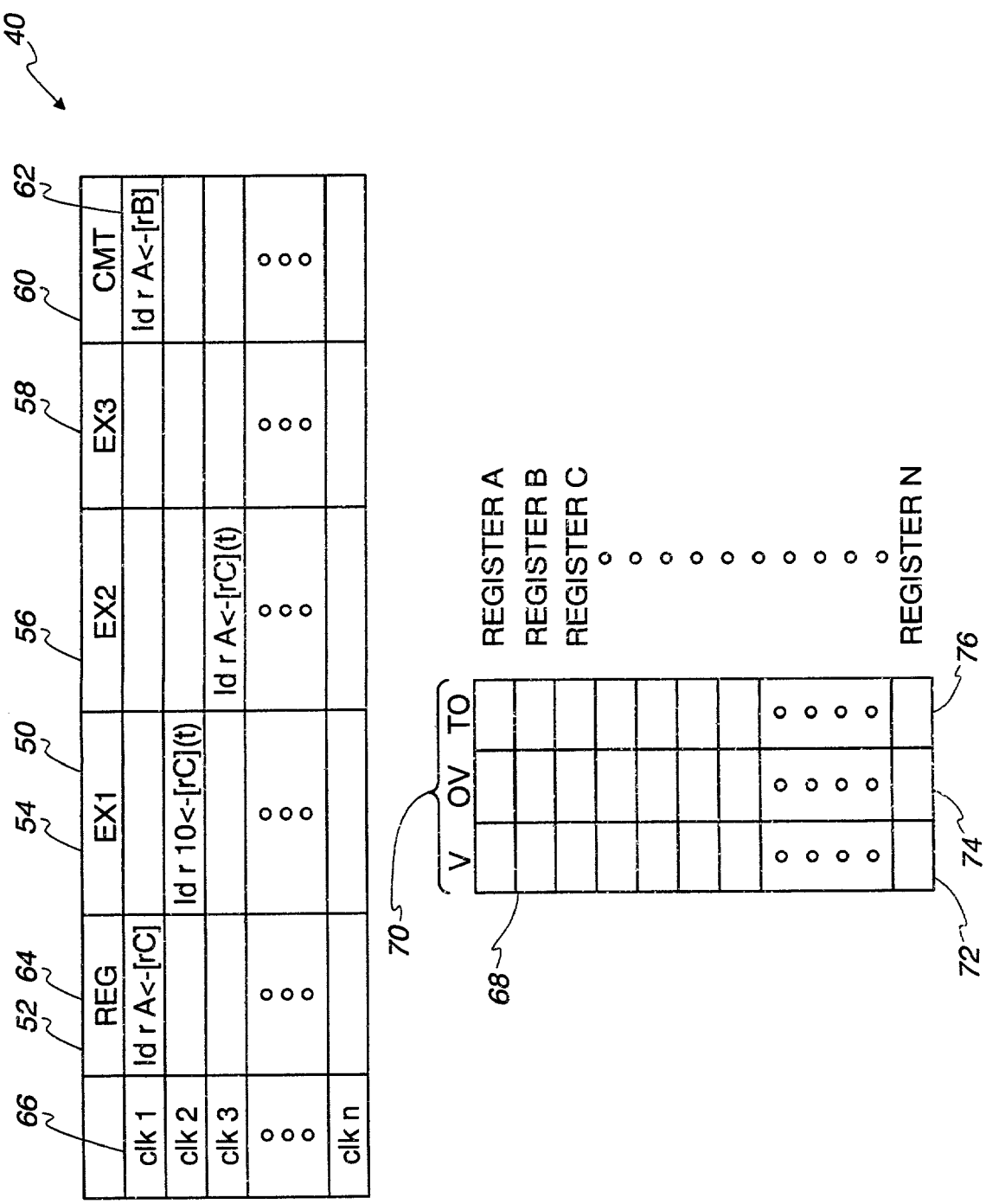
FIG. 2 is an exemplary diagram that generally illustrates an architecture that uses multiply pendent registers to manage memory accesses.

Now referring to FIG. 2, an exemplary diagram that generally illustrates an architecture 40 that uses multiply pendent registers to manage memory accesses is depicted. As shown in FIG. 2, an instruction pipeline 50 associated with a processor (not shown) includes a register read stage 52, a plurality of execution stages 54, 56 and 58 and an instruction commit stage 60. The stages 52–60 shown in FIG. 2 depict a well known abstraction of the manner in which instructions may be processed by a processor. In particular, the register read stage 52 represents an instruction processing phase during which a processor decodes an instruction, determines which memory registers or registers are operated on by the instruction (e.g., the operands of an instruction) and reads the contents of the registers operated on by the instruction. The execution stages 54–58 represent an instruction processing phase during which the operation specified by an instruction is executed. For example, in the case of an instruction that adds the contents of two registers, an addition operation is performed during the execution stages 54–58. In the case of an instruction that performs a memory operation (e.g., a load instruction), the physical location of a resource being operated on by the instruction may be determined during the execution stages 54–58. In general, the commit stage 60 represents an instruction processing phase during which the validity of an instruction and its results are checked and, if no exceptions (i.e., problems) are identified during the commit stage 60 of processing an instruction, the instruction is retired (i.e., treated as completed) and purged or drained from the instruction pipeline 50.

By way of example only, the movements or status of a first program instruction 62 and a second program instruction 64 with respect to the pipeline stages 52–60 is shown for a plurality of clock cycles 66. As depicted in FIG. 2, the first program instruction 62 is specified by the program code to be executed before the second program instruction 64. The first and second program instructions 62 and 64 are load instructions that load register A with the contents of the memory locations pointed to by (i.e., addressed by) registers B and C, respectively. More specifically, the first instruction 62 includes an operation that writes the contents of the memory location pointed to by register B to register A and the second instruction 64 includes an operation that writes the contents of the memory location pointed to by register C to register A. Thus, execution of the first and second instructions 62 and 64 includes a WAW sequence that may be subject to a data hazard if the respective latencies associated with the first and second program instructions 62 and 64 are such that the result (i.e., the returned data) of the second program instruction 64 is returned prior to the result (i.e., the returned data) of the first program instruction 62. Of course, results or returned data associated with an instruction are only written to (i.e., are used to update) a destination memory resource if, during the commit stage 60 of processing the instruction, no exceptions or execution problems were detected such as, for example, an invalid op-code.

In the particular example shown in FIG. 2, if the first and second program instructions 62 and 64 are simply allowed to write to register A upon their respective data returns, the results or returned data associated with the first program instruction 62 will be used to overwrite the data already written to register A following the data return for the second program instruction 64. To prevent a WAW data hazard from occurring during execution of the first and second program instructions 62 and 64, the write operations associated with the instructions 62 and 64 to register A must occur so that the final contents of register A are the contents of the memory location pointed to by register C, regardless of the order in which the results of the first and second program instructions 62 and 64 are returned.

In contrast to known instruction stalling memory assess management architectures, systems and techniques, the exemplary architecture 40 shown in FIG. 2 enables the second program instruction 64 to proceed to the execution stages 54–58 of the instruction pipeline 50 prior to receipt of a data return or response associated with the first program instruction 62. Thus, the architecture 40 shown in FIG. 2 eliminates the instruction stalling that would normally be used to delay entry of the second program instruction 64 to the execution stages 54–58 of the instruction pipeline 50 while a memory register that is accessed (e.g., written to) by the second program instruction 64 is pending (i.e., awaiting a data return and an update of the memory register with the returned data). In this case, for example, the memory register A is pending at clock cycle "clk 1" when the first program instruction 62 enters the commit stage 60 of the instruction pipeline 50. As depicted in FIG. 2, the second program instruction 64, which requires access to register A, is allowed to enter the first execution stage 54 during a second clock cycle "clk 2" while register A is still pending a data return. It should be noted that absent any exceptions or other problems, the first instruction 62 is purged or drained out of the pipeline 50 at clock cycle "clk 2."

Thus, the exemplary architecture 40 shown in FIG. 2 enables the second program instruction 64 to traverse the execution stages 54–58 of the instruction pipeline 50 before the results or returned data associated with the first program instruction 62 have been used to update register A. As a result, the register A may have copending data returns associated with the first and second program instructions 62 and 64. In other words, the register A may be multiply pendent on primary and secondary responses or data returns for the respective first and second program instructions 62 and 64. Accordingly, data updates to register A in response to receipt of the primary and secondary data returns of the copending respective first and second program instructions 62 and 64 must be managed based on the order in which the data returns for the first and second program instructions 62 and 64 are received. In particular, to avoid a WAW data hazard or error, the data updates must be managed so that the contents of register A are not overwritten by the data returned in response to the first program instruction 62 if the data returned in response to the second program instruction 64 has already been written to register A.

To manage the updates to register A to prevent a WAW data hazard, the architecture 40 shown in FIG. 2 provides a data structure 68. The data structure 68 may be implemented using a memory table or scoreboard configuration or any other desired data structure configuration that enables a plurality of logical bit values associated with memory structures, such as memory registers, to be tracked over a plurality of processor clock cycles. When implemented using a table or scoreboard configuration, the data structure 68 preferably includes a plurality of bit fields or bits 70, each of which may store a logical value based on the current pendency status of a memory register or any other memory location or resource that may be accessed during the processing of program instructions in the instruction pipeline 50.

In general, the data structure 68 is used to track the pendency status of a plurality of memory resources such as, for example, memory registers. When the data structure 68 is used to track the pendency status of memory registers, each of the memory registers being tracked corresponds to a plurality of tracking bits within the data structure 68. For example, each tracked memory register may be associated with a set of the bit fields 70 (e.g., a row of the scoreboard or table) so that if three bit fields are used, each memory register uniquely corresponds to three tracking bits. Of course, more tracking bits, bit fields, etc. may be used to track each memory resource, if desired.

Each of the plurality of bit fields or bits 70 corresponds to pendency information associated with a particular memory resource such as, for example, memory registers accessed by a processor. For each of the memory resources tracked by the data structure 68, the pendency information may include information associated with one or more registers that are currently pending on a data return. In the example shown in FIG. 2, the data structure 68 tracks primary and secondary pendency information for each memory resource. In particular, each of the bits fields or bits 70 is associated with one of either a primary pendency or a secondary pendency of a memory register or other memory resource being tracked by the data structure 68.

By way of example, a first bit field or bit 72 in FIG. 2 is designated as the valid or "V" bit and is set (i.e., a logical value of "1" is stored in the first bit field 72) when a memory register is pending in response to a request for access by a first or primary program instruction such as, for example, the first program instruction 62. Further, a second bit field or bit 74 is designated as the overflow valid bit or "OV" bit and is set when a memory register is already pending (i.e., the "V" bit for that memory register is set) when a second or secondary program instruction such as, for example, the second program instruction 64 requests access to that memory register. Still further, a third bit field or bit 76 designated as the tagged outstanding bit or the "TO" bit is also set when the secondary program instruction requires access to an already pending memory register. Of course, any other desired designations for the bit fields or bits 72–76 may be used instead of "V," "OV" and "TO."

As described in greater detail in connection with FIG. 4, the bit values within the bit fields 70 function as tracking bits or tracking information for tracking multiple levels of pendency and the order of data returns for one or more memory registers or any other memory resource accessed by a processor. In this manner, the logical values of the bits 70 within the data structure 68 are used to manage data updates to multiply pendent registers in response to the order or sequence in which data returns for copending program instructions are received.

In addition to the data structure 68, the exemplary architecture 40 shown in FIG. 2 also attaches a tag "(t)," identifier bit or other identifying information to each resource accessed by an instruction in the pipeline 50. Each tag or identifier indicates whether an instruction in the pipeline 50 is associated with a primary access or a secondary access of a memory resource. Further, each tag or identifier follows an instruction as it traverses the stages 52–60 of the instruction pipeline 50 so that the instruction may be easily identified in the commit stage 60 of the instruction pipeline 50 as being associated with, for example, a secondary pendency of a memory register or other memory resource being accessed by that instruction. For example, in the event that two instructions that access the same memory resource cause that memory register to become copending on two respective data returns, the tags or identifiers may be used to determine whether returned data are associated with the primary pendency or the secondary pendency.

FIG. 3 is an exemplary schematic block diagram of a system 80 that uses the architecture 40 shown in FIG. 2 to manage memory accesses. As shown in FIG. 3, the system 80 includes a memory resource access detector 82, a pipeline stall unit 84, a memory resource tracking information database 86, a data return detector 88 and a memory resource update unit 90. The memory resource tracking information database 86 enables the system 80 to track the pendency status of a plurality of memory resources such as, for example, memory registers. The memory resource tracking information database 86 preferably provides a plurality or set of tracking bits for each memory resource tracked so that for each clock cycle the current primary and secondary pendency information as well as data return order information for each tracked memory resource is encoded within the bit pattern or combination of logical values provided by each set of tracking bits. The memory resource tracking information database 86 may be implemented using a data structure such as, for example, the scoreboard or table type data structure 68 shown in FIG. 2 or any other desired type of data structure capable of tracking a plurality of logical bit values associated with memory resources for a plurality of processor clock cycles. The memory resource tracking information database 86 may use any suitable memory technology such as, for example, random access memory, magnetic or optical storage media, electrically erasable programmable read only memory, etc.

The memory resource access detector 82 analyzes instructions that require access to memory resources and determines, for each of these instructions, if the required memory access involves a primary pendency, a secondary pendency or a tertiary pendency of a memory resource. The memory resource access detector 82 is in communication with the memory resource tracking information database 86 and stores logical values within the tracking bits of the database 86 so that the bit pattern of each set of tracking bits is indicative of the current pendency status of the memory resource associated with that set of tracking bits. The memory resource access detector 82 is also in communication with the pipeline stall unit 84. In the event that the memory resource access detector 82 determines that an instruction requires a tertiary access of a memory resource, the memory resource access detector 82 causes the pipeline stall unit 84 to stall the instruction pipeline (e.g., the instruction pipeline 50 shown in FIG. 2) so that the instruction requiring tertiary access to the memory resource is not executed (i.e., is stalled in the register read stage of the instruction pipeline).

The data return detector 88 analyzes data returns to determine whether returned data is associated with a primary pendency or a secondary pendency. Preferably, the data return detector 88 uses a tag or other identifier such as, for example, the tag "(t)" shown and discussed in connection with FIG. 2 to determine whether returned data is associated with a primary or a secondary pendency. Additionally, the data return detector 88 determines the order in which data returns for multiply pending memory resources are received. The data return detector 88 is in communication with the memory resource tracking information database 86 and uses the tag information and the data return order information to reset or change the logical values of the tracking bits within the database 86 so that the bit patterns for each set of tracking bits reflects the order in which data returns associated with primary and secondary pendencies are received.

The memory resource update unit 90 receives information relating to the order in which data is returned for primary and secondary pendencies and uses this information to update memory resources in a manner that avoids a WAW data hazard. In particular, if the memory resource update unit 90 receives information from the data return detector 88 indicating that data associated with a primary pendency of a memory resource is received prior to receipt of returned data associated with a secondary pendency of the memory resource, the memory resource update unit 90 first updates the memory resource with the data returned in connection with the primary pendency and then updates the memory resource with the data returned in connection with secondary pendency. On the other hand, if the memory resource update unit 90 receives information indicating that returned data associated with a secondary pendency of a memory resource is received prior to receipt of returned data associated with a primary pendency of that memory resource, then the memory resource update unit 90 updates the memory resource with the data returned in connection with the secondary pendency and ignores (i.e., does not update the memory resource with) the data returned in connection with the primary pendency.

Of course, the system 80 can be implemented using any desired combination of hardware, firmware and software including, for example, application specific integrated circuits, discrete logic, analog circuitry, microprocessors, microcontrollers, reduced instruction set processors, high-level programming languages, assembly languages, etc. However, the system 80 is preferably implemented using software stored on a computer readable medium (e.g., a processor memory) and executed by a reduced instruction set computer (RISC). An exemplary flow diagram illustrating such a software-based implementation of the system 80 is shown and discussed in connection with FIG. 4.

FIG. 4 is an exemplary detailed flow diagram illustrating one manner in which the architecture 40 shown in FIG. 2 and the system 80 shown in FIG. 3 may be used to manage memory accesses. At block 102, the memory resource access detector 82 (FIG. 3) determines whether a first or primary program instruction in an instruction pipeline requires access to a memory location, register or any other computer readable memory. If access by a first or primary program instruction is not required, requested or otherwise needed, the memory resource access detector 82 remains at block 102. On the other hand, if the memory resource access detector 82 determines at block 102 that a first or primary program instruction requires access to a memory location or register, at block 104 the memory resource access detector 82 stores a first logical value in a first tracking bit of the memory resource tracking information database 86 such as, for example, the "V" bit 72 within the data structure 68 shown in FIG. 2, thereby establishing a primary pendency for the memory location or register to which the first or primary instruction requires access. The first logical value may be a "1," in which case, at block 104, the memory resource access detector 82 sets the first tracking bit (i.e., stores a "1" in the first tracking bit). Alternatively, the first logical value may instead be a "0."

The memory resource detector 82 determines at block 106 whether another program instruction (i.e., a secondary program instruction) is in the instruction pipeline and requires access to the memory register or resource being accessed by the first or primary program instruction. If the memory resource detector 82 determines at block 106 that secondary access to the memory register or resource pending for the primary program instruction is not required, then the data return detector 88 determines at block 108 whether or not a primary data return or response to the first instruction has been received. If the data return detector 88 determines (using, for example the tag information) at block 108 that no primary data return or response has been received, the memory resource detector 82 redetermines at block 106 whether secondary access of the memory register or resource pending for the first program instruction is needed. On the other hand, if the data return detector 88 determines at block 108 that a primary data return or response has been received for the first or primary instruction, the data return detector 88 may change the logical value of the first tracking bit or store a second logical value different from the first logical value in the first tracking bit at block 110. For example, in the case of the exemplary architecture 40 shown in FIG. 2, the "V" bit 72 of the data structure 68 may be reset to a logical "0." Additionally, at block 110 the memory resource update unit 90 may update the memory register associated with the first or primary program instruction with the returned data.

If the memory resource detector 82 determines at block 106 by examining the bit patterns stored within the memory resource tracking information database 86 that secondary access to a currently pending memory register is required (e.g., by determining that the "V" bit 72 for that register or memory location is currently set within the data structure 68), then at block 112 the memory resource detector 82 stores a first logical state in second and third tracking bits of the memory resource tracking information database 86 by, for example, setting the "OV" and "TO" bits 74 and 76 within the data structure 68 shown in FIG. 2. The memory resource detector 82 determines at block 114 whether or not a third instruction in the instruction pipeline requires access to a memory register or location that currently has a secondary pendency (e.g., the "OV" and "TO" bits 74 and 76 within the data structure 68 are currently set). If the memory resource detector 82 determines at block 114 that tertiary access to a memory location or register that currently has a secondary pendency is required, then the memory resource access detector 82 causes the pipeline stall unit 84 to stall the instruction pipeline (e.g., the instruction pipeline 50 of FIG. 2) at block 118 to prevent the third program instruction from entering the execution stages of the pipeline.

The data return detector 88 determines at block 116 whether a primary data return or response, which is responsive to the first or primary program instruction pending in the instruction pipeline, has been received. If the data return detector 88 determines at block 116 that a primary data return or response has been received, then at block 120 the data return detector 88 changes the logical values of the first and second tracking bits or stores the second logical value in the first and second tracking bits within the memory resource tracking information database 86. For example, at block 120 the data return detector 88 resets the "V" and "OV" bits 72 and 74 within the data structure 68 (FIG. 2). Additionally, the register update unit 90 updates the memory register or resource with the returned data at block 120. The data return detector 88 determines at block 122 whether or not a secondary data return or response associated with the secondary instruction has been received. If no secondary data return has been received, then the data return detector 88 continues to determine at block 122 whether or not a secondary data return has been received. On the other hand, if a secondary data return has been received, then at block 124 the data return detector 88 changes the logical value of the third tracking bit or stores a second logical value in the third tracking bit and may overwrite the first tracking bit with the logical value written to it at block 120. For example, the "V" and "TO" bits 72 and 76 within the data structure 68 may be reset (i.e., a logical "0" may be stored in these bits).

If the memory resource access detector 82 determines at block 116 that a primary data return has not been received, then the data return detector 88 determines at block 126 whether a secondary data return or response has been received. If the data return detector 88 determines at block 126 that no secondary data return or response has been received, then the memory resource access detector 82 executes block 114. On the other hand, if the data return detector 88 determines at block 126 that a secondary data return or response has been received, then the data return detector 88 changes the logical values of the first and third tracking bits at block 128 by, for example, resetting the "V" and "TO" bits 72 and 76 within the data structure 68. Additionally, the register update unit 90 updates the memory register with the returned data at block 128.

The data return detector 88 determines at block 130 whether a primary data return has been received. If the data return detector 88 determines at block 130 that a primary data return has not been received, then the data return detector 88 re-executes block 130. On the other hand, if the data return detector 88 determines at block 130 that a primary data return has been received, then the data return detector 88 changes the logical value of the second tracking bit and overwrites the first tracking bit with its current logical value at block 132 by, for example, resetting the "V" and "OV" bits 72 and 74 of the data structure 68.

Thus, the memory access management architecture and technique described in connection with FIGS. 2, 3 and 4 may store pendency information by using a memory resource tracking information database 86 (FIG. 3) or, more particularly, tracking bits within a data structure such as, for example, a table or scoreboard such as the data structure 68 shown and described in connection with FIG. 2, to manage updates for multiply pendent memory registers or other memory resources. More specifically, as shown by way of example in FIG. 4, the memory access management technique may change the logical values of the tracking bits and update each multiply pendent memory register or resource in a sequence or order that is based on the order in which data returns for that memory register or resource are received. In other words, if a memory register or resource has a primary pendency and a secondary pendency, the pendency information or tracking bits may be changed in one sequence or may be stored in one manner if the primary data return is received prior to receipt of the secondary data return and may be changed in another sequence or stored in another manner if the secondary data return is received prior to the primary data return. Further, the technique shown by way of example in FIG. 4 writes returned data to a multiply pending memory register or other memory resource (i.e., updates the memory register or resource) so that if a primary data return is received after receipt of a secondary data return, the data associated with the primary data return is not used to overwrite the data returned by the secondary data return.

Additionally, although it appears that at blocks 120 and 124 of FIG. 4 the data return detector 88 stores the same logical value twice in the first tracking bit, the example shown in FIG. 4 enables the use of a single response to the receipt of primary and secondary data returns. The use of such a single response simplifies the hardware needed to perform the functions that change, store or otherwise control the logical values stored within the tracking bits. In other words, as shown in FIG. 4, each secondary return always results in a resetting of the "V" and the "TO" bits 72 and 76 and each primary return always results in resetting of the "V" and "OV" bits 72 and 76. Furthermore, while tracking bits are discussed by way of example, pendency information associated with program instructions may be stored or tracked in other manners using, for example, digital words having multiple bits.

Figures 5, 6:
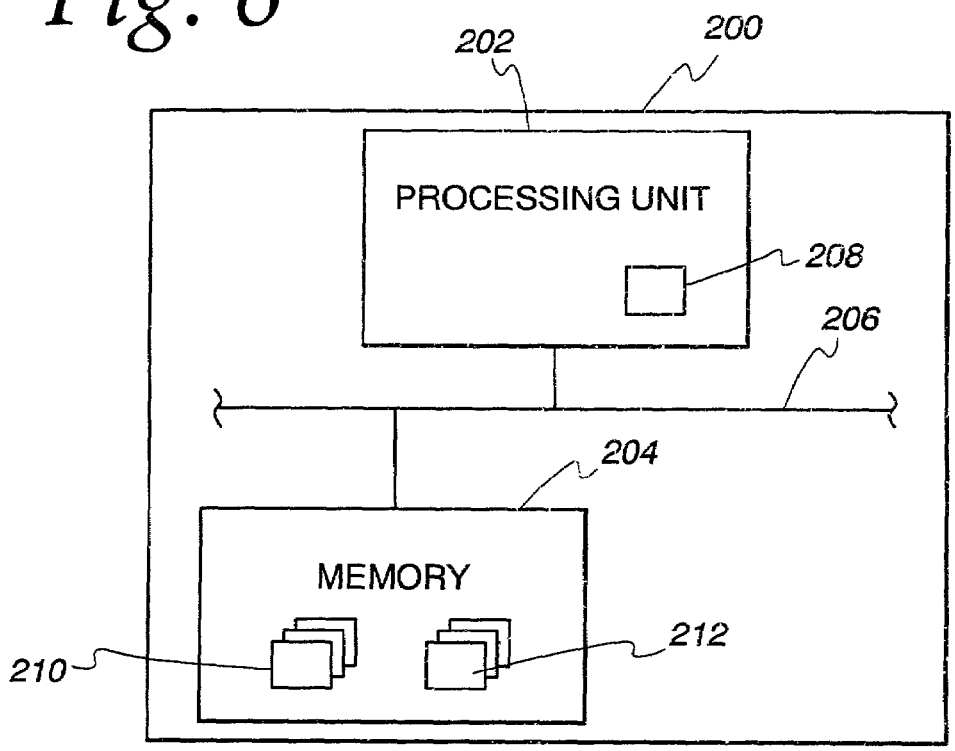
FIG. 5 is a state table that depicts logical states or bit patterns that may be associated with a tracked memory resource using the architecture and technique shown in FIGS. 2 and 4.
FIG. 6 is a schematic block diagram of another system that may be used to implement the memory access architecture and technique shown in FIGS. 2 and 4.

FIG. 5 is a state table 150 that depicts logical states or bit patterns that are associated with a tracked memory resource using the technique shown in FIG. 4. By way of example, the first, second and third tracking bits are designated as "V," "OV" and "TO," respectively. As shown in the table 150, the bit pattern "000" indicates that the memory resource being tracked does not have any pending instructions that require access to the memory resource. The bit pattern "001" indicates that data returns associated with primary pendency has been received and a data return for the secondary pendency is outstanding, which indicates an in order return. The "001" bit pattern occurs upon execution of block 120 shown in FIG. 4. The bit pattern "010" indicates that data returns associated with the secondary pendency has been received first and the primary data return is outstanding, which indicates an out of order return. The "010" bit pattern occurs upon execution of block 130 shown in FIG. 4 and is indicative of a pending WAW data hazard condition. The bit pattern "100" indicates that a memory resource currently has only a primary pendency. This bit pattern occurs upon execution of block 104 shown in FIG. 4. The bit pattern "111" indicates that a memory resource has both primary and secondary pendencies. The bit pattern "111" occurs upon execution of block 128 shown in FIG. 4.

As can be seen from FIG. 5, because each memory resource may have a status or condition that is one of five distinct states, three tracking bits (e.g., "V," "OV" and "TO") are needed to identify these states. However, three bits provide eight possible logical bit patterns or conditions and, as a result, the bit patterns "011," "101" and "110" are unused and do not occur when carrying out the technique shown in FIG. 4.

Further, it is important to recognize that all instructions that access memory resources, upon entering the register read stage of an instruction pipeline, must check the status of those memory resources accessed by the instruction prior to allowing the instruction to proceed to the execution stages of the pipeline. For example, an instruction that reads a memory resource that is currently pending a data return (i.e., returned data will be written to the memory resource) must not be allowed to proceed to the execution stages of the pipeline until the result is available and/or written to the memory resource. Such a condition occurs during a RAW sequence and, as noted above, data forwarding techniques may be used to enable more efficient use of the pipeline under such conditions. Thus, if an instruction that reads a memory resource at the register read stage of the pipeline determines that the "OV" and "TO" tracking bits for that memory resource are set (i.e., indicating that the resource has a secondary pendency) using, for example, a simple "OR" function, that instruction may either be stalled until all "OV" and "TO" tracking bits have been reset (i.e., are "0") and, if desired, may be more expeditiously processed using a data forwarding technique.

FIG. 6 is an exemplary schematic block diagram of another processor or system 200 that may be used to implement the architecture and technique shown in FIGS. 2 and 4. As shown in FIG. 6, the processor or system 200 may include a processing unit 202 and a computer readable memory 204, which may be communicatively coupled to the processing unit 202 via a data bus 206. The processing unit 202 may also include an instruction pipeline 208 such as, for example, the pipeline 50 shown in FIG. 2, or any other desired pipeline architecture. The memory 204 may include one or more software routines 210 that may be executed by the processing unit 202 to implement multiply pendent memory resource architectures such as, for example, the architecture 40 shown in FIG. 2 and to carry out methods such as, for example, the method 100 shown in FIG. 3. Additionally, the memory 204 may include a plurality of memory registers 212 that the processing unit 202 may access in accordance with the techniques described herein. Although the memory registers 212 are shown as being contained within the memory 204, some or all of the memory registers 212 may instead reside within the processing unit 202, if desired. Likewise, some or all of the software routines 210 may be stored within processing unit 202 or within any other memory resource (not shown) within the system or processor 200. Preferably, but not necessarily, the system 200 is implemented using a RISC architecture, which architecture is commonly known and, thus, will not described in greater detail herein. Of course, other system architectures may be used instead without departing from the scope and the spirit of the invention.

Although certain methods and apparatus implemented in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method of managing access to a memory resource, comprising:
   storing first tracking information in response to a first instruction requiring access to the memory location;
   storing second and third tracking information in response to a second instruction requiring access to the memory location; and
   managing access to the memory location by changing the first, second and third tracking information in one of a plurality of sequences based on an order of a first instruction response and a second instruction response.

2. The method of claim 1, wherein storing the first, second and third tracking information includes storing one of first and second logical states in respective first, second and third tracking bits.

3. The method of claim 2, wherein storing the one of the first and the second logical states in the respective first, second and third tracking bits includes setting the first, second and third tracking bits.

4. The method of claim 1, wherein changing the first, second and third tracking information in one of the plurality of sequences includes storing one of first and second logical states in respective first, second and third tracking bits.

5. The method of claim 4, wherein storing the one of the first and second logical states in the respective first, second and third tracking bits includes resetting the first, second and third tracking bits.

6. The method of claim 1, wherein changing the first, second and third tracking information in one of the plurality of sequences includes changing the first and third tracking information prior to changing the second tracking information in response to receiving the second instruction response prior to receiving the first instruction response.

7. A method of managing access to a memory register, comprising:
   establishing a data structure that includes pendency information associated with the memory register;
   receiving a first instruction that requires access to the memory register;
   storing first information associated with a primary pendency of the memory register in the data structure;
   receiving a second instruction that requires access to the memory register;
   storing second information associated with a secondary pendency of the memory register in the data structure; and
   changing the first and second information stored in the data structure based on an order of receipt of a first data return associated with the first instruction and a second data return associated with the second instruction.

8. The method of claim 7, wherein establishing the data structure that includes pendency information associated with the memory register includes establishing at least one of a table and a scoreboard that includes the first and second information.

9. The method of claim 8, wherein the step of establishing the at least one of the table and the scoreboard that includes the first and second information includes establishing a first tracking bit associated with the primary pendency of the memory register and second and third tracking bits associated with the secondary pendency of the memory register.

10. The method of claim 7, wherein storing the first information associated with the primary pendency of the memory register in the data structure includes setting a first bit in the data structure.

11. The method of claim 10, wherein storing the second information associated with the secondary pendency of the memory register in the data structure includes setting second and third bits in the data structure.

12. The method of claim 7, wherein changing the first and second information stored in the data structure based on the order of receipt of the first and second data returns includes logically inverting the first information and logically inverting a portion of the second information.

13. A method of controlling access to a memory register, comprising:
    establishing a data structure that is adapted to contain primary and secondary pendency information associated with the memory register;
    receiving a first instruction in an instruction pipeline, wherein the first instruction requires access to the memory register;
    storing first information associated with a primary pendency of the memory register in the data structure;
    receiving a second instruction in the instruction pipeline, wherein the second instruction requires access to the memory register;
    storing second information in the data structure associated with a secondary pendency of the memory register; and
    changing the first and second information stored in the data structure based on an order of receipt of first and second responses corresponding to the respective first and second instructions.

14. The method of claim 13, wherein establishing the data structure that is adapted to contain the primary and secondary pendency information associated with the memory register includes establishing a plurality of memory bits, each of which corresponds to one of the primary and secondary pendency information.

15. The method of claim 13, wherein changing the first and second information stored in the data structure based on the order of receipt of the first and second responses includes changing a first logical value of a first memory location within the data structure that is associated with the secondary pendency of the memory register prior to changing a second logical value of a second memory location within the data structure that is associated with the secondary pendency of the memory register.

16. A system for managing access to a memory resource, comprising:
    a memory resource tracking information database to contain primary and secondary pendency information associated with the memory resource;
    a memory resource access detector to change at least one of the primary and the secondary pendency information in response to instructions requiring access to the memory resource;
    a data return detector to change at least one of the primary and the secondary pendency information based on an order of receipt of data returns; and
    a memory resource update unit to use at least one of the primary and secondary pendency information to update the memory resource to prevent a data hazard.

17. The system of claim 16, wherein the memory resource tracking information database is a scoreboard including a plurality of tracking bits associated with the memory resource.

18. The system of claim 16, wherein the memory resource update unit uses the at least one of the primary and secondary pendency information to determine an order of receipt of instruction responses for use in preventing the data hazard.

19. A memory management system, comprising:
    a computer readable memory; and
    a processing unit having an instruction pipeline, wherein the processing unit is adapted to receive first and second instructions in the instruction pipeline that each require access to the computer readable memory, wherein the processing unit is further adapted to store primary and secondary pendency information in a data structure in response to receipt of the first and second instructions in the instruction pipeline and wherein the processing unit is further adapted to change the primary and secondary pendency information stored in the data structure based on an order of receipt of primary and secondary data returns that correspond to the respective first and second instructions.

20. The system of claim 19, wherein the processing unit is further adapted to establish the data structure to include a plurality of bits, each of which is associated with one of the primary and secondary pendency information.

21. The system of claim 19, wherein the processing unit is further adapted to change the primary and secondary pendency information stored in the data structure based on the order of receipt of the primary and secondary data returns by changing a first logical value of a first memory location of the data structure prior to changing a second logical value of a second memory location of the data structure.

22. The system of claim 19, wherein the data structure is one of a table and a scoreboard including a plurality of bit fields corresponding to the primary and secondary pendency information.

23. The system of claim 19, wherein the processing unit is further adapted to tag each of the first and second instructions to identify the first and second instructions as being one of a primary access and a secondary access.

24. A software routine stored on a computer readable memory and adapted to be executed by a processor, the software routine comprising:
    first software that establishes a data structure adapted to contain primary and secondary pendency information associated with a memory resource;
    second software that receives a first instruction in an instruction pipeline, wherein the first instruction requires access to the memory resource;
    third software that stores first information associated with a primary pendency of the memory resource in the data structure in response to receipt of the first instruction;
    fourth software that receives a second instruction in the instruction pipeline, wherein the second instruction requires access to the memory resource;
    fifth software that stores second information associated with a secondary pendency of the memory resource in the data structure; and
    sixth software that changes the first and second information stored in the data structure based on an order of receipt of first and second responses corresponding to the respective first and second instructions.

25. The system of claim 24, wherein the first software is further adapted to establish the data structure to include a plurality of memory bits, each of which is associated with one of the primary and secondary pendency information.

26. The system of claim 24, wherein the sixth software is further adapted to change the first and second information stored in the data structure based on the order of receipt of the first and second responses by changing a first logical value of a first memory location within the data structure that is associated with the secondary pendency of the memory resource prior to changing a second logical value of a second memory location within the data structure that is associated with the secondary pendency of the memory resource.

* * * * *